UNITED STATES PATENT OFFICE 2,816,046

Patented Dec. 10, 1957

2,816,046

TREATMENT OF ACIDIC CARBON BLACKS

Adolf Damusis, Cleveland, Ohio, assignor to The Sherwin-Williams Company, Cleveland, Ohio, a corporation of Ohio No Drawing. Application February 9, 1954,
Serial No. 409,256

12 Claims. (Cl. 106—307)

This invention relates, as indicated, to treated carbon blacks and more specifically to acidic carbon blacks that have been treated with organic amines. The paint, ink and rubber industries make considerable use of carbon blacks and specially developed properties of the carbon blacks are very useful in improving their performance in paints, ink and rubber. The color intensity and tint, the structure and electrical conductivity, the surface acidity and a mount of volatile matter, the fineness and adsorptive capacity of particles of carbon blacks are all properties of carbon blacks which affect the tone, flow, viscosity, tack, drying time, flooding and floating of inks, paints and lacquers, and also affect the heat build-up, reinforcing ability and hardness of vulcanizable rubber stocks.

The term "carbon pigments" or "carbon blacks" as used herein will be understood to include the wide groups of black pigments which include channel impingement blacks, furnace blacks of thermal and combustion type, and all the lamp blacks.

Acidic and neutral carbon blacks, in general, may be characterized by:

(1) surface polarity due to carboxyl groups present on the surface of the carbon black particle which is a typical property of the acidic channel carbon blacks and of the acidic lamp blacks; and (2) internal spacial polarizability depending on the constitution of carbon black macro-molecule which is typical of the finest furnace blacks and acetylene blacks and results in a high structure forming tendency and high electrical conductivity.

Surface polarity of carbon black seems to be an essential factor in its adsorptive power for gas and other small molecules, or of the small active groups of the surrounding medium, such as hydroxyls, carboxyls, and metal cations such as are present in driers. High surface polarity also causes difficulty in obtaining complete dispersion throughout paints.

This invention concerns itself with the channel impingement blacks and all true acidic lamp blacks which are classifiable under group 1 above. Acidic carbon blacks of highly developed surface polarity, hydrophilic in character, contain a large amount of volatile matter and are highly adsorptive. The large number of carboxyl groups in the structure of carbon black macro-molecules produces a highly acidic character, which in respect to the ionization constant in a very concentrated sludge is only slightly weaker than 0.1N acetic acid. Acidic carbon black or carbon pigments as used in paints adsorb moisture from the air, also adsorb carbon dioxide, react with accelerators, decompose the driers used and cause flooding and floating. When carbon blacks react with the driers used in paint compositions, there is a replacement of the heavy metal cation and a release of the free acid residue of the drier. The presence of free acids in the paint composition together with the decomposed drier leads to greatly increased drying times due to depletion of the drier and the oxidation inhibition characteristics of free acids. Floating and flooding also results, producing a spotty, streaked and non-uniform final color. Acidic carbon blacks exhibit varying degrees of floating and flooding. When first produced in tints, these blacks cause a black flooding, and after aging there is a non-flooding stage followed later by a white flooding stage.

Because of the fact that the acidic carbon blacks used in the industry today adsorb moisture from the surroundings, they must be handled in special water-proof bags or containers, thereby adding to the cost of the material.

Acidic carbon blacks, as used in the rubber industry, impart to the rubber stock such highly desirable characteristics as high tensile strength and resistance to tear and abrasion. Unfortunately, since most channel or acidic blacks are very fine in particle size, they are dispersed throughout the rubber compound only after considerable difficulty and a high heat build-up. These difficulties necessitate special processing techniques. Likewise, these same acidic carbon blacks have a pronounced tendency to adsorb the accelerators used in rubber compounding, such as diphenyl guanidine and other organic accelerating compounds. Since accelerators are adsorbed by the blacks, more must be used to keep the curing times within reasonable limits.

It is believed that the detrimental effects of carbon black pigments are principally limited to acidic carbon blacks, as most neutral carbon blacks do not usually possess any of these unfavorable characteristics. Therefore, much research and experimentation has gone into the improvement of acidic carbon blacks or carbon pigments.

Attempts have been made to improve the characteristics of acidic carbon blacks by the heating in an air restricted atmosphere. These have resulted in a deactivated or devolatilized carbon black in which the carboxyl groups are no longer present but the carbon blacks so treated now have new properties which give rise to entirely different reactions in paint. Neutralization with alkalies has also been tried. However, the resulting product is too easily hydrolyzed, adsorbs carbon dioxide and moisture, and decomposes driers with the subsequent formation of free acids.

Treating acidic carbon black with alkali salts or organic acids has also been tried. Here again the results obtained are much the same as those obtained by neutralization with alkali, in that the alkali metals are easily replaced by the heavy metals of the drier.

Therefore, it is a principal object of this invention to provide a new type of carbon black and method of producing the same comprising making acidic carbon blacks substantially inert to the driers and accelerators normally used in paint manufacture, e. g., lead, manganese, cobalt, etc., naphthenates, tallates, oleates, stearates, octoates, etc.

Another object of this invention is to provide a novel carbon black and method for producing the same, which comprises making acidic carbon blacks substantially inert to the accelerators and like compounds used in rubber manufacture, such as diphenyl guanidine, etc.

Another object of this invention is to provide an improved carbon black, which when used as a carbon filler in rubber compounds does not substantially affect the normal curing time and is easily dispersed within the rubber stock with low heat build-up.

Still another object of this invention is to provide a method of treatment of acidic carbon blacks whereby either a hydrophobic or a hydrophilic carbon black may be obtained.

Still another object of this invention is to provide a carbon black which when used as a carbon pigment in paints does not substantially affect the normal drying time and has improved anti-flooding and anti-floating properties.

Another object of this invention is to provide an improved type carbon black which possesses none of the detrimental characteristics while retaining substantially all of the beneficial characteristics of acidic carbon blacks.

Still another object of this invention is to provide an improved type carbon black which is greatly organophilic and hydrophobic.

Other objects of this invention will appear as the description proceeds.

To the accomplishment of the foregoing and related ends, said invention, then, consists of the means hereinafter fully described and particularly pointed out in the appended claims, the following description setting forth in detail certain illustrative embodiments of the invention, such disclosed means constituting, however, but a few of the various forms in which the principle of this invention may be employed.

It has been found that treatment of acidic carbon blacks with organic amines yields a carbon black that has all of the above desired characteristics.

Broadly stated, then, this invention comprises novel carbon black and the method of producing the same which comprises conditioning an acidic carbon black by intimately contacting a finely divided carbon black having a pH of no more than about 6 with a solution of an organic amine.

The carbon blacks that are to be treated by the method of this invention are all channel blacks and acidic lamp blacks. These carbon blacks have a maximum pH of about 6; the most frequently encountered carbon blacks being those having an original pH of 2.8 to 3.3. Examples of these blacks are Columbian's "Neo-Spectra 2," Cabot's "Carbolac" and Continental's "Kosmos F-4" and other channel blacks that are high, medium and low in color, hard and medium in processing and electrically conductive.

The organic amines which are useful in the practice of this invention are in general any one of the available organic amines. However, particularly useful compounds are the primary and secondary long chained fatty amines, short chained mono-di-polyamines and hydroxy amines. Examples of some of the monoamines are primary and secondary methylamines, ethylamines, propyl and isopropyl amines, butyl amines; other aliphatic monoamines, such as octylamine, decylamine, dodecylamine, octadecylamine, etc. and all mixed aliphatic aromatic amines which are strong enough to react rapidly with weak organic acids. Examples of some of the hydroxyamines are monoethanolamine, diethanolamine, propanolamine, isopropanolamine, monomethylethanolamine, monoethylethanolamine, morhpoline, etc. Examples of some of the short and long chained di- and polyamines are hydrazine, methylene diamine, ethylene diamine; 1,3 propyldiamine; 1,2 propyldiamine; 1,4 butane diamine; 1,5 pentene diamine; 1,6 hexane diamine, dimethyl amino propylamine, diethylene triamine; 3,3 imino bispropylamine, and long chained fatty diamines such as amino propyl fatty acid amines, etc. The type of amine used to treat these acidic carbon blacks depends upon the type of carbon black desired. To obtain a hydrophobic carbon black, it is necessary to treat such black with fatty amines. A chemical bond is obtained between the carboxyl group of the acidic carbon black and the amino group of the fatty amines and the long aliphatic tails of the fatty amines are directed into the suspension medium which gives the treated carbon black hydrophobic properties. The longer the aliphatic tails projecting into the suspension medium, the more the treated carbon black resists the adsorption of driers, moisture and accelerators. It has been found that the aliphatic decyl groups develop the most highly hydrophobic properties and non-adsorptive tendencies. In order to obtain a hydrophilic carbon black, the acidic carbon blacks must be treated with short chained mono, diamine or polyamines. When diamines are reacted with the carboxyl groups of the carbon black, there is a chemical union with only one amino group. The second unreacted amino group remains on the outside of the carbon black particle and is in contact with the surrounding medium. Because the so treated carbon black particle now contains a free amino group on its surface, it has very good affinity to water and thus may be successfully employed in water paints. The acidic character of the carbon black is changed, when reacted with these short chained di- and polyamines, to an alkaline character, and these carbon black pigments are useful in paints which require alkaline pigments. The short chained monoamines, hydroxy amines, when used to treat acidic carbon blacks give rise to neutral pigments which are useful in paints which require a neutral pigment.

When fatty amines are used to neutralize the acidic carbon blacks, the neutralization reaction is as follows:

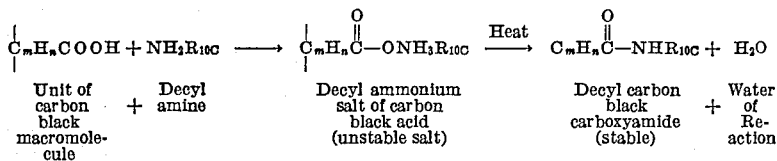

| Unit of carbon black macromolecule | + | Decyl amine | Decyl ammonium salt of carbon black acid (unstable salt) | Decyl carbon black carboxyamide (stable) | + | Water of Reaction |

It can be seen that in the first step of the reaction carbon black forms an unstable alkyl ammonium salt with the organic amine, which salt when heated to 105° C. to 120° C. loses water and transforms into a stable amide.

When short chained mono, di- or polyamines are used to treat the acidic carbon blacks, the reaction is as follows:

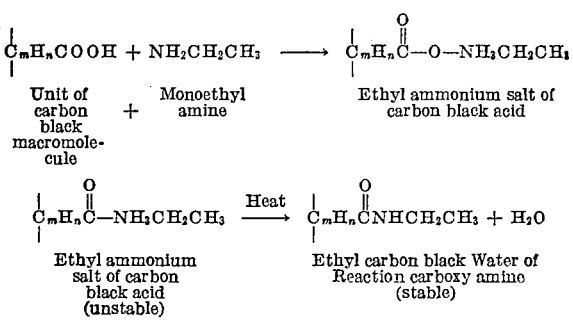

| Unit of carbon black macromolecule | + | Monoethyl amine | Ethyl ammonium salt of carbon black acid |

| Ethyl ammonium salt of carbon black acid (unstable) | | Ethyl carbon black Reaction carboxy amino (stable) | Water of |

Thus it can be seen that water-soluble, short chained mono, di-, and polyamines will react with the carboxyl group of the carbon black forming alkyl ammonium salts, which when heated to 105° C. to 120° C. will lose one molecule of water and transform into a stable amide.

If it is desired to obtain a very highly hydrophilic carbon black, then diamines or polyamines are used to treat such acidic carbon blacks. The reaction here is as follows:

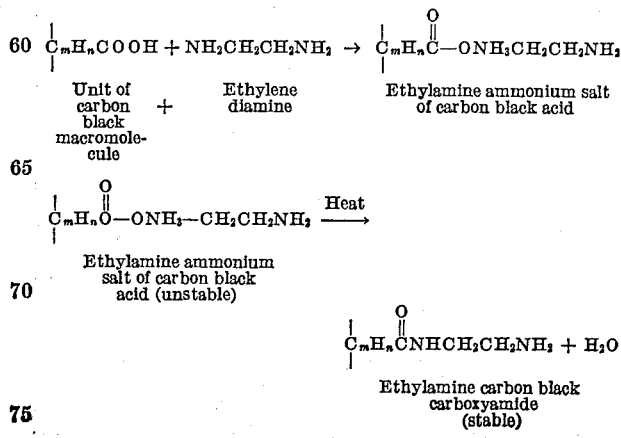

| Unit of carbon black macromolecule | + | Ethylene diamine | Ethylamine ammonium salt of carbon black acid |

| Ethylamine ammonium salt of carbon black acid (unstable) |

| Ethylamine carbon black carboxyamide (stable) |

The treatment of acidic carbon black as taught by this invention may be broken down into various groups, such as, (1) treatment of carbon blacks with organic amines which have been dissolved in organic solvents, (2) treatment of carbon blacks with amines which have been dissolved in water, (3) treatment of carbon blacks with gaseous organic amines at room or slightly elevated temperatures.

Following are examples of detailed preparation of the novel carbon black products, and it will be understood that this invention is not limited to the specific conditions described nor to the specific materials used in the examples:

Example I 1,000 grams of a high color channel black, having a pH of 2.8 to 3.3 and a volatile matter content of between 14% and 17%, were agitated with 100 grams of a 40% water solution of monomethyl amine. Both materials were stirred together in a closed container in order to prevent the loss of the volatile amines. Because of the fact that an exothermic neutralization reaction is involved here, the temperature of the mixture rises. The mixture was agitated for approximately 20 to 30 minutes and the resulting product dried at from about 110° C. to 120° C. in order to transform the ammonium salts to a stable amide and to remove the water from the product. It was found that the resulting product still adsorbed moisture and driers slightly and was wettable with water.

Example II 1,000 grams of a high color channel black having a pH of about 2.8 to 3.3 and a volatile matter content of approximately 14% to 17% were agitated with 90 grams of n-butyl amine and 110 grams of water. The water was added to prevent the danger of flash of the material. Here again, the materials were stirred in a closed container and the temperature of the mixture raised to 77° C. to about 82° C. until the exothermic reaction of the neutralization started. After the mixture had been stirred for approximately 20 to 30 minutes at 77° C. to 82° C. the resulting product was dried at 110° C. to 120° C. in order to expel the water and transform the unstable ammonium salt which was formed to a stable amide. The resulting carbon black resulting from this treatment was very hydrophobic and exhibited little tendency to absorb moisture, driers and accelerators.

Example III 1,000 grams of a medium color channel black having a pH of from about 3.1 to 5 and a volatile matter content of from about 7% to 11% were agitated with 75 grams of mono-isopropyl amine and 100 grams of water. The materials were stirred in a closed container until the exothermic reaction began and the stirring continued thereafter for about 20 to 30 minutes. The resulting product was dried at 110° C. to 120° C. in order to expel the water of reaction and to transform the unstable ammonium salt to a stable amide. The resulting product was only slightly hydrophobic and showed a decreased tendency toward the adsorption of driers, moisture and accelerators.

Example IV 1,000 grams of a high color channel black having a pH of about 2.8 to 3.3 and a volatile matter content of approximately 14% to 17%, were agitated with 76 grams of monoethanol amine and 7,000 grams of water. These materials were agitated for approximately 30 to 60 minutes and the water was boiled off. The sludge was dried at about 110° C. to 120° C. until all of the water of reaction was removed and the stable amide was formed. The resulting carbon black was neutral in character and extremely hydrophilic.

Example V 1,000 grams of a medium color carbon black having a pH of about 3.0 to 5.0 and a volatile matter content of from about 7% to 11% were agitated with 132 grams of decyl amine, 500 grams of alcohol and 4,000 grams of water. The decyl amine was first dissolved in the alcohol and the resulting mixture then added to the water. In this case, the mixture of carbon black, alcohol, water and decyl amine was kept overnight and then filtered and dried at 110° C. to 120° C. in order to remove the water of reaction and to transform the unstable ammonium salt into the stable amide. The resulting carbon black was very hydrophobic and exhibited no tendency toward adsorption of driers, moisture and accelerator.

Example VI 1,000 grams of a high color channel black having a pH of about 2.8 to 3.3 and a volatile matter content of approximately 14% to 17% were agitated with 76 grams of a 76% water solution of ethylene diamine and 8,000 grams of water. The materials were agitated when mixed together and the sludge was kept overnight. The resulting sludge was then filtered and dried to 110° C. to 120° C. until the water of reaction was entirely removed and the unstable salt was converted to the stable amide. The resulting product was very hydrophilic and the acidic surface of carbon black was transformed to alkaline.

Example VII 1,000 grams of a high color channel black having a pH of about 2.8 to 3.3 and a volatile matter content of approximately 14% to 17% were agitated with 220 grams of decyl amine and 11,000 grams of organic thinner. The heavy sludge was agitated for from about 15 to 30 minutes until the ammonium salts of the amine with carbon black was formed. The sludge was then filtered and heated to 110° C. to 120° C. until the unstable ammonium salt was decomposed to a stable amide. The water of reaction together with the solvent was boiled off and collected in a cooling system which had a trap for water. In this case, it was not necessary to completely dry the sludge as the treated carbon black could be incorporated into paint in the sludge form. Should it be necessary to completely remove all traces of amines, the treated carbon black may be filtered and washed with a thinner. It was found that from about 80% to 95% of the acidity of the carbon black had been neutralized. The resulting product was highly hydrophobic and had no tendency to adsorb driers, moisture or accelerators.

Example VIII 1,000 grams of a medium color channel black having a pH of about 3.0 to 5.0 and a volatile matter content of from about 7% to 11% were agitated with 132 grams of decyl amine and 7,000 grams of mineral spirits. The decyl amine was first dissolved in the mineral spirits and the carbon black was then added to the solution. The sludge was agitated for 30 minutes and in this case allowed to stand overnight. The sludge was then filtered and heated to 110° C. to 120° C. until all of the water of reaction was removed. In this example, the reflex system having a water trap was employed. It is unnecessary to completely dry the carbon black cake, but it is important to remove the water of reaction because in doing so the unstable ammonium salt is converted to a stable amide. The resulting carbon black may be incorporated directly into paint and the product of this particular treatment was found to be greatly hydrophobic with practically no tendency of adsorption of driers, moisture and accelerators.

Example IX 1,000 grams of a high color channel black having a pH of about 2.8 to 3.3 having volatile matter content of approximately 14% to 17% were agitated with 390 grams of fatty diamine and 5,000 to 10,000 grams of organic solvent. The primary fatty diamine was first dissolved in the organic solvent and the carbon black added to the resultant solution. The heavy sludge was agitated for approximately 30 minutes and kept overnight. The sludge was then heated under reflux with a water trap at 110° C. to 130° C. until the ammonium salts had been decomposed to the stable amide and the complete removal of water of reaction. It is also possible to filter the sludge and dry it under a vacuum or under atmospheric pressure until all of the water of reaction is expelled. In this case, approximately 90% of the carbon black acidity had been neutralized and the product was highly hydrophobic.

*Example X*

1,000 grams of a high color channel black having a pH of about 2.8 to about 3.3 and a volatile matter content of approximately 14% to 17% were agitated with 160 grams of 2-ethyl hexyl amine and 5,000 to 10,000 grams of organic solvent. The 2-ethyl hexyl amine was first dissolved in the organic solvent and the carbon black was then added to the resultant solution. The sludge was agitated for approximately 30 minutes and kept overnight. The resultant sludge or carbon cake was then heated under reflux at 110° C. to 130° C. until all the water of reaction had been boiled off and the unstable ammonium salt had been decomposed to the stable amide. In this case, about 90% of the original acidity of the carbon black had been neutralized and the product was highly hydrophobic.

The pH of a carbon black is determined by first suspending 5 grams of the carbon black in 50 milliliters of boiled distilled water. After the sludge is boiled for approximately 5 minutes, the water lost by evaporation is replaced and the sludge is cooled to room temperature. Measurement of the pH of the sludge is accomplished with a standard immersion type glass electrode pH meter while the sludge is being thoroughly agitated.

As to the amount of organic amine added to the acidic carbon black in each case, it is calculated as being the theoretical amount necessary to completely neutralize the acidity of the carbon black and is based on the total acidity of the carbon black and the molecular weight of the organic amine used to treat the black.

Total acidity of the carbon black is determined by the following method. One gram of carbon black is suspended in 25 milliliters of 0.1N sodium hydroxide (aqueous solution). The mixture is thoroughly agitated and filtered after being allowed to stand a few hours. About 5 or 10 milliliters of the aliquot portion is backtitrated with a standardized hydrochloric acid solution and the acid value of the carbon black is calculated from the milliliters of 0.1N sodium hydroxide used for neutralization.

Although the amount of amine added is the theoretical quantity necessary to completely neutralize the acidity of the carbon black, as a practical matter, it has been found that a maximum of 95% neutralization can be effected by this method depending on the organic amine used. However, the improvements in the character of the carbon black by such incomplete neutralization are manifest at from 40% to 95% neutralization.

Solvents, water or organic, are added in amounts necessary to obtain a workable sludge.

The preferred means of treating a carbon black is prior to its incorporation into the composition to be pigmented therewith, for the reason that the other constituents of the composition will protect the carbon black particles and prevent neutralization of the adsorbed acidity by the amine, while allowing the ingredients, e. g., driers, soluble in the composition to react.

It is to be noted that there is a variation in the drying of the treated carbon black depending on the type of solvent used as the suspending medium. In the case of the suspending medium being an organic solvent, the sludge need not necessarily be totally dried. After the reaction of the amine with the carbon black, the sludge is usually heated to 105° C. to 120° C. and kept there until all the water of reaction is removed and the unstable ammonium salt is transformed to the stable amide. At this point, the largest part of the organic solvent is still left in the sludge, which renders the sludge easily redispersible in the paint without any additional grinding. If, however, water is used as the suspending medium or solvent, the sludge should be dried substantially completely.

The acidic carbon blacks may also be treated with gaseous amines; however, these gaseous amines are limited to low chain amines which have a low or moderate boiling temperature. It was noted when carbon blacks are treated with methyl or ethyl amines, the resulting carbon black is of the hydrophilic carbon type and still possesses adsorptive tendencies. When amines having 5 to 6 carbons in the chain are used, moderate hydrophobic properties are imparted and the adsorptive properties are considerably lessened.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. The method of conditioning an acidic carbon black having a maximum pH of about 6 which comprises intimately contacting such carbon black in finely divided form with a solution of an organic basic reacting amine to form an unstable ammonium salt of said carbon black, and heating such salt to a temperature of from about 105° C. to about 130° C. for a period of from about .5 hour to about 2 hours to drive off substantially all of the water of reaction and to convert said unstable ammonium salt to a stable amide.

2. The method in accordance with claim 1 in which the organic basic reacting amine is dispersed in mineral spirits.

3. The method in accordance with claim 1 in which the organic basic reacting amine is dispersed in water.

4. The method of claim 1 wherein the organic amine is a fatty amine.

5. The method of claim 1 wherein the organic amine is a water-soluble short chained monoamine.

6. The method of claim 1 wherein the organic amine is a water-soluble short chained polyamine.

7. The method of claim 1 wherein the organic amine is hydroxy amine.

8. The method of claim 1 wherein the organic amine is mono-methyl amine.

9. The method of claim 1 wherein the organic amine is ethyl amine.

10. The method of claim 1 wherein the organic amine is ethylene diamine.

11. The method of claim 1 wherein the organic amine is monoethanol amine.

12. The method of claim 1 wherein the organic amine is octylamine.

References Cited in the file of this patent

UNITED STATES PATENTS

| | | |
|---|---|---|
| 1,848,213 | Wiegand | Mar. 8, 1932 |
| 2,282,006 | Sloan | May 5, 1942 |
| 2,294,394 | Erskine | Sept. 1, 1942 |
| 2,468,978 | Hollis | May 3, 1949 |
| 2,578,605 | Sears | Dec. 11, 1951 |
| 2,635,057 | Jordan | Apr. 14, 1953 |